United States Patent [19]

Maeda et al.

[11] Patent Number: 4,847,480
[45] Date of Patent: Jul. 11, 1989

[54] FOCUS ERROR DETECTING APPARATUS

[75] Inventors: Takanori Maeda; Susumu Nomura, both of Saitama, Japan

[73] Assignee: Pioneer Electronic Corporation, Tokyo, Japan

[21] Appl. No.: 167,282

[22] Filed: Mar. 11, 1988

[30] Foreign Application Priority Data

Mar. 13, 1987 [JP] Japan .................................. 62-59741

[51] Int. Cl.⁴ ............................................... G01J 1/20
[52] U.S. Cl. ...................................... 250/201; 369/45
[58] Field of Search ..................... 250/201; 369/44–46

[56] References Cited

U.S. PATENT DOCUMENTS 4,242,579 12/1980 Bouwhuis .......................... 250/201

Primary Examiner—Edward P. Westin
Assistant Examiner—Khaled Shami
Attorney, Agent, or Firm—Sughrue, Mion, Zinn, Macpeak & Seas

[57] ABSTRACT

A focus error detecting apparatus is improved by splitting the light detector into three portions, with a first portion located between second and third portions and being elongated. The elongation prevents an out-of-focus condition where the detection light spot is elliptically elongated in the elongation direction from being falsely detected as the focused condition.

12 Claims, 6 Drawing Sheets

FIG. 12 PRIOR ART
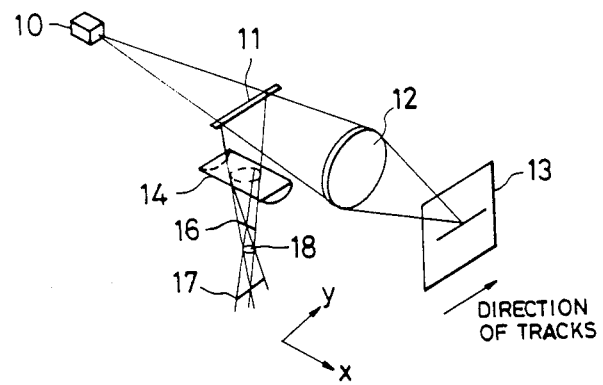
DIRECTION OF TRACKS
FIG. 13 PRIOR ART
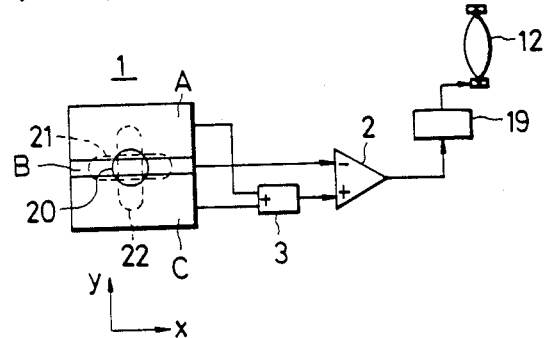
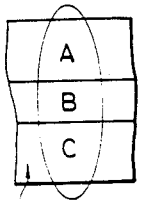
FIG.14(a) PRIOR ART
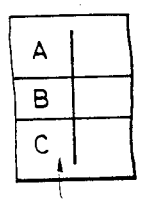
FIG.14(b) PRIOR ART
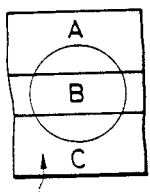
FIG.14(c) PRIOR ART
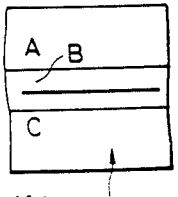
FIG.14(d) PRIOR ART
FIG.14(e) PRIOR ART
FIG.14(f) PRIOR ART
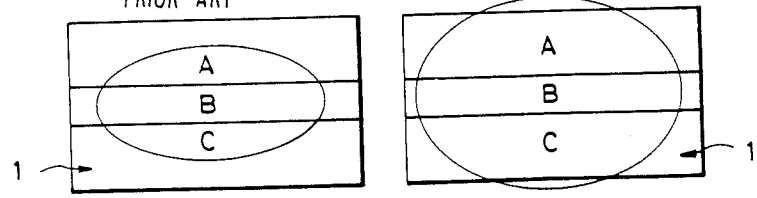

FOCUS ERROR DETECTING APPARATUS

BACKGROUND OF THE INVENTION

The present invention relates to a focus error detecting apparatus suitable for use in a compact disk player, a video disk player, other optical disk players, and so on.

According to the present invention, a light detector is divided substantially into three portions and a central one of the three portions is formed to be substantially longer than the portions on both sides thereof.

When a signal is recorded onto or reproduced from a given media such as an optical disk, it is necessary to focus light on the media.

FIG. 12 is a block diagram illustrating a conventional focus error detecting apparatus for controlling the focused condition and FIG. 13 is a circuit diagram for conducting an automatically focusing operation on the basis of a reflected laser beam from the media.

In FIG. 12, a light beam emitted from the laser source 10 is passed through a beam splitter 11 and an objective lens 12, and then focused on an information disk 13. A reflected light beam having information recorded on the disk is directed through the objective lens 12, the beam splitter 11 to a cylindrical lens 14 to make an astigmatic aberration of the reflected laser beam. The longitudinal magnification and the lateral magnification of the cylindrical lens 14 are different due to its curved configuration, so that the light transmitted through the cylindrical lens 14 forms different projected images as different positions. As shown in FIG. 12, the cylindrical lens 14 is disposed with the longitudinal axis along the x-axis. When the light beam is projected into the cylindrical lens, a narrow projected image 16 oriented in the x-axis direction is formed on a plane near the cylindrical lens 14. A narrow projected image 17 oriented in the y-axis direction is formed on a plane distanced from the cylindrical lens 14. Further, a substantially circular projected image 18 is formed on a plane between the above two planes. A light detector 1 as shown in FIG. 13 is disposed in the passage of the light beam from the cylindrical lens 14. The light detector 1 is divided substantially into three portions A, B and C. The portions A and C are arranged to either side of the portion B. The respective outputs of the portions A and C are added by an adder 3. The respective outputs of the portion B and the adder 3 are received at two inputs of a differential amplifier 2 which outputs the difference between the inputs. The output F of the differential amplifier 2 is expressed by $F=\beta B-(\alpha A+\gamma C)$, and this output F constitutes the focus error signal (here $\alpha$, $\beta$ and $\gamma$ are constants, and hereinafter it is assumed that each of $\alpha$, $\beta$ and $\gamma$ is equal to 1 for the sake of simplification). The output of the differential amplifier 2 is applied to a lens driving circuit 19 to move the objective lens 12 toward or away from the information disk 13.

When the light beam transmitted through the objective lens 12 is focused to form accurately a convergence point on the information disk 13, a circular projected image indicated by a solid line (20) is formed on the light detector 1 and the output of the amplifier 2 becomes zero, so that the lens driving circuit 19 instructs the objective lens 12 to remain fixed at the present position. When the objective lens 12 is much close to the information disk 13 and the projective image as indicated by a dotted line (22) is formed on the light detector 1, the amount of the light incident upon the portion B is smaller than the total amount of the light incident upon both portions A and C. The added signal which is the sum of the signals detected by the portions A and C is larger than a signal detected by the portion B, and therefore the differential amplifier 2 outputs a positive signal to the lens driving circuit to thereby move the objective lens 12 apart from the information disk. When the objective lens 12 is much distant from the information disk 13 and the projected image as indicated by a dotted line (21) is formed on the light detector 1, the amount of the light incident upon the portion B is larger than the total amount of the light incident upon the portions A and C. Accordingly, the added signal which is the sum of the signals detected by the portions A and C is smaller than the signal detected by the portion B, and the amplifier 2 outputs a negative signal to the lens driving circuit 19 to thereby move the objective lens toward the information disk 13.

FIG. 14 shows an enlarged view of the light detector as shown in FIG. 13 and various projected images thereon. The light spot on the light detector 1 is adjusted so as to be substantially circular in a focused condition as shown in FIG. 14(c). If the focus is shifted, in one direction, out of the focused condition, the light spot becomes a focal line as shown in FIG. 14(b), and, if the focus is shifted further in the same direction, the light spot becomes an approximate ellipse which is elongated longitudinally (in the direction of the focal line) as shown in FIG. 14(a).

If the focus is reversely shifted, the light spot becomes a focal line, as shown in FIG. 14(d), extending in the direction substantially perpendicular to the focal line shown in FIG. 14(b), and if the focus is further shifted in the same direction, the form of an approximate ellipse which is elongated transversely (in the direction of the focal line) becomes larger and larger as shown in FIGS. 14(e) and (f).

Assume now that the length of each of the portions A, B and C is selected to be 500 μm (in the direction of the division lines that is, in the horizontal direction in the drawings), that the width of each of the portions A and C is selected to be 130 μm, that the width of the portion B is selected to be 80 μm, that the diameter of the circular light-spot in the focused state is set to be 100 μm, that the distance between the two focal lines is set to be 200 μm, and that the energy distribution in the light spot is uniform for the sake of simplification. Then, the sum of the respective outputs of the portions A and C of the light detector 1 (that is, the output of the adder 3) and the output of the portion B of the light detector 1 change as shown in FIG. 15 correspondingly to the focusing condition. As the result, the focus error signal $F(=B-(A+C))$ changes as shown in FIG. 16. Reference characters a to f in FIG. 16 correspond to reference characters a to f in FIG. 14.

As will be apparent from FIG. 16, the level of the signal F becomes zero at the position c, and the signal F is reversed in polarity between the positions b and d. Accordingly, it is possible to control the focus error using the signal F.

The signal F, however, has another zero-crossing point at the position e. Therefore, when the focus servo is turned on, it is necessary to distinguish the position c from the position e, for example, on the basis of the signal level, so as to prevent the servo from being locked-in at position If this point is disregarded, the pull-in operation becomes unstable.

SUMMARY OF THE INVENTION

It is therefore an object of the present invention to make zero-crossing occur at only one point so that focus servo can be made accurate and reliable.

According to the present invention, in a focus error detecting apparatus comprising a light detector for receiving light being passed through a given member and having astigmatism, and a signal generating circuit for generating a focus error signal on the basis of an output of the detector, the detector is divided substantially into three portions such that a first one of the portions is arranged between second and third ones of the portions, and the first portion is formed substantially longer that either of the second and third portions so that the state in which the amount of light received by the first portion is larger than that of each of the second and third portions is maintained when the shape of the light detector becomes long in the direction of the division lines.

BRIEF DESCRIPTION OF THE DRAWINGS

FIG. 12 is a block diagram of a conventional focus error detecting apparatus;

FIG. 13 is a circuit diagram for conducting an automatically focusing operation on the focus error detecting apparatus as shown in FIG. 12;

FIG. 14 is an enlarged view of the light detector as shown in FIG. 13; and

DETAILED DESCRIPTION OF THE PREFERRED EMBODIMENTS

The light passed through the media such as a disk is given astigmatism by predetermined means is irradiated onto the light detector. The output of the light detector is input to the signal generation circuit in which a focus error signal is produced. The detector is substantially divided into three portions such that a first one of the portions is arranged between the second and third portions. The first portion is formed substantially longer than each of the second and third portions so that the state in which the amount of light received by the first portion is larger than that of each of the second and third portions is maintained when the shape of the light spot on the light detector is elongated in the direction of the division lines.

Figure 1:
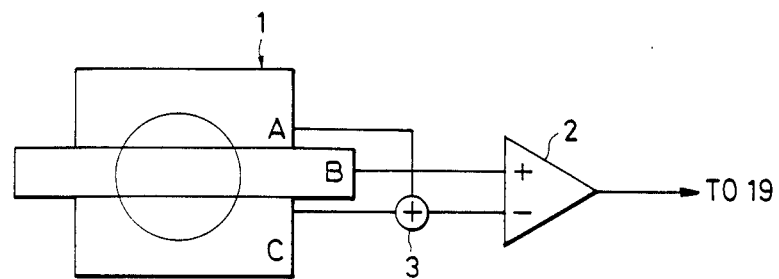
FIG. 1 is a block diagram of a focus error detecting apparatus according to the present invention.

FIG. 1 is a block diagram of the focus error detecting apparatus according to the present invention, wherein parts corresponding to those in FIG. 13 are referenced correspondingly. According to the invention, similarly to the conventional case, a light detector is divided into three portions A, B and C by two division lines which are vertical to the direction of tracks on the information disk, that is, a beam spot is moved in the direction parallel to the division lines when a tracking operation is carried out. The respective outputs of the portions A and C are added by an adder 3, and a differential amplifier 2 acting as a signal generating circuit generates a focus error signal on the basis of the difference between the output of the portion B and the output of the adder 3.

The apparatus of FIG. 1 is different from that of FIG. 13 in the arrangement of the light detector 1. In the light detector 1 according to the invention, the portion B is formed to be substantially longer in the direction of the division lines than either of the portions A and C.

Figure 2:
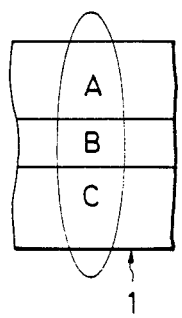
FIGS. 2 to 9 are plan views of various embodiments of the light detector.
Figure 2:
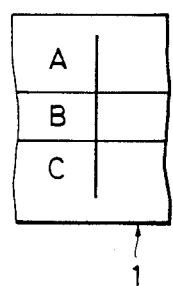
Figure 2:
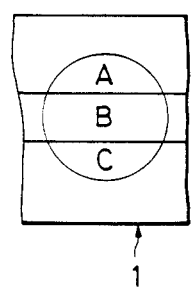
Figure 2:
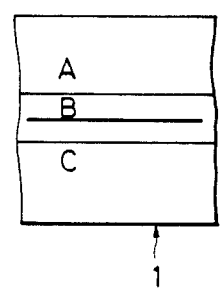
Figure 2:
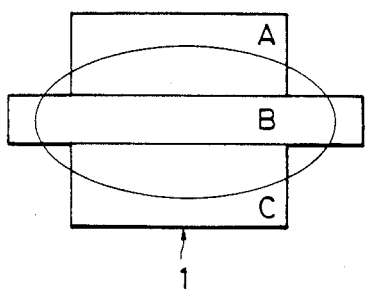
Figure 2:
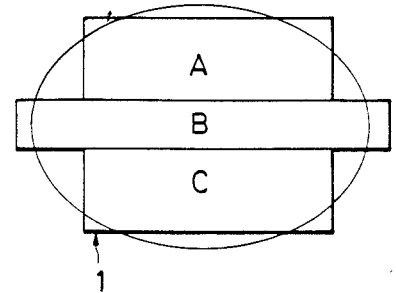

Consequently, the relationship between the change in shape of the light spot and the light detector becomes as shown in FIG. 2. In FIG. 2, the reference characters a to f correspond to reference characters a to f in FIG. 14. The changes at the positions a to d are as same as those in the previously described case, but the changes at the positions e and f are different from those in the earlier case.

Figure 10:
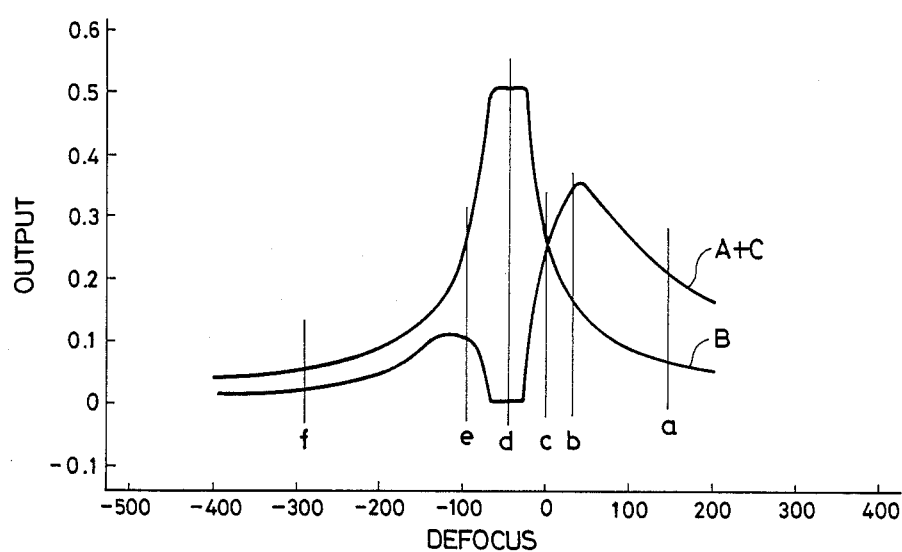
FIGS. 10 and 11 are characteristic diagrams of the light detector.
Figure 11:
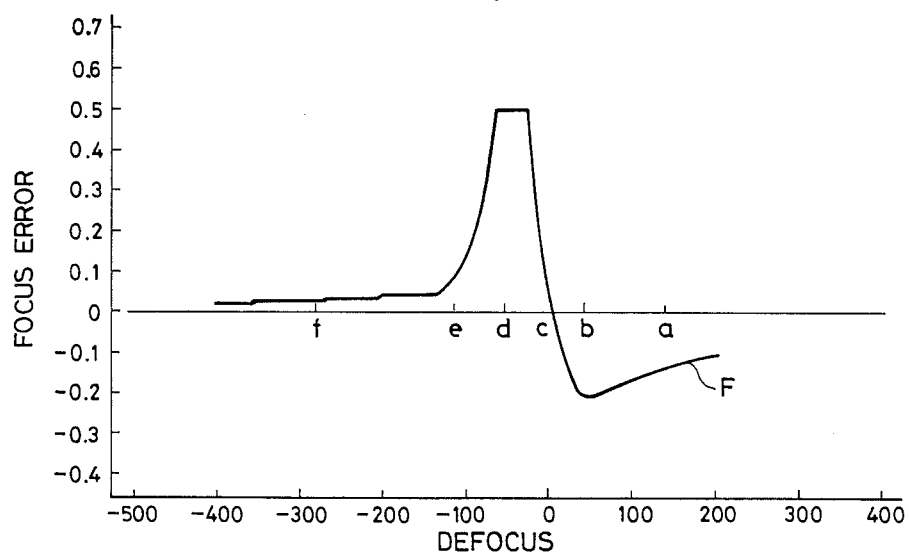
Figure 15:
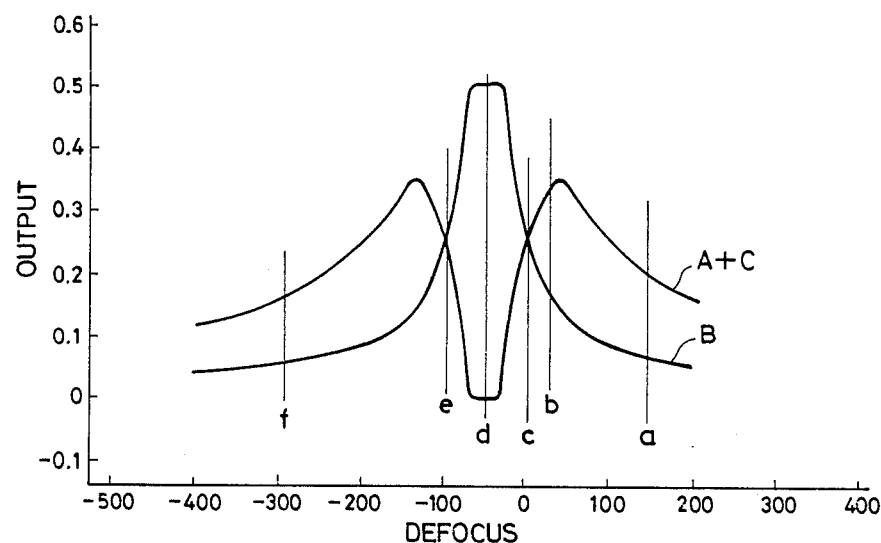
FIGS. 15 and 16 are characteristic diagrams of the light detector as shown in FIG. 13.
Figure 16:
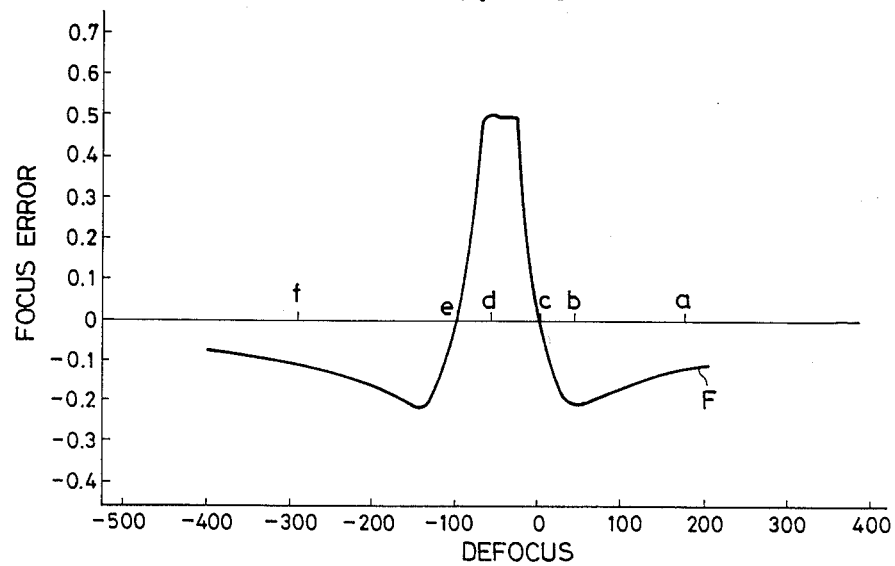

Specifically, when the diameter of the light spot becomes large in the direction of the division lines, the portion B can receive a larger portion of the light spot since the portion B is elongated, while the portions A and C can not receive a larger portion of the light spot since each of the portions A and C is shorter than the portion B. Accordingly, the amount of light received by the portion B is larger than that received by each of the portions A and C. If the portion B is selected to be 500 $\mu$m and 80 $\mu$m in length and width respectively, and each of the portions A and C is selected to be 100 $\mu$m and 130 $\mu$m in length and width respectively, while making the other conditions the same as those in the above-mentioned case, the output characteristics at the various focus positions become as shown in FIG. 10. The signal F obtained by subtracting the sum of the respective outputs of the portions A and C from the output of the portion B has a characteristic as shown in FIG. 11. As will be apparent from FIGS. 10 and 11, the signal F is not reversed in polarity between the points f and d (that is, there is no zero-crossing point between those points) because the state where the output of the portion B is larger than the sum of the respective outputs of the portions A and C is maintained at positions d, e and f and therebetween. As a result, there is only one zero-crossing point at the position c.

Figure 3:
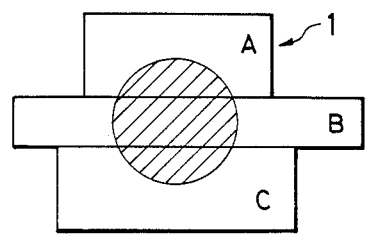

FIGS. 3 to 8 show alternative embodiments of the detector 1. In the embodiment of FIG. 3, not only is the portion B selected to be longer than each of the portions A and C, but the portions A and C are made different in length from each other.

Figure 4:
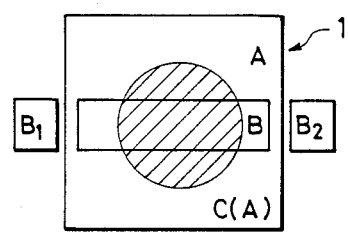

In the embodiment of FIG. 4, the portion A and the portion C are formed integrally with each other (therefore the adder 3 is not needed), and the portion B is formed inside the portion C. It may be, however, considered that the detector 1 is divided into three portions because the portion B is formed to be longer than the diameter of the light spot in the focused state. Moreover, portions $B_1$ and $B_2$ are independently formed in the direction of the length of the portion B. Since the respective outputs of the portions $B_1$ and $B_2$ are added to the output of the portion B, the portions $B_1$ and $B_2$ can be regarded as part (extended portions) of the portion B.

Figure 5:
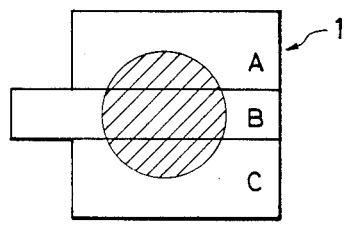

FIG. 5 shows an embodiment in which the portion B is elongated in only one direction.

Figure 6:
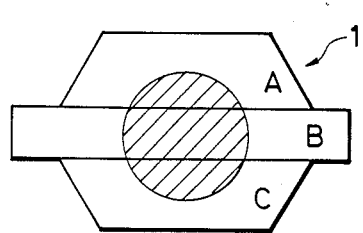
Figure 7:
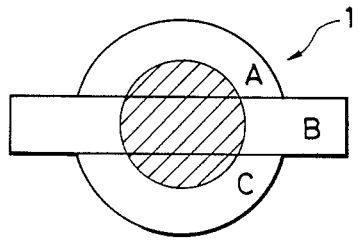

FIG. 6 and FIG. 7 show embodiments in which not only is the portion B is elongated but the portions A and C are formed to be trapezoidal and semicircular respectively.

Figure 8:
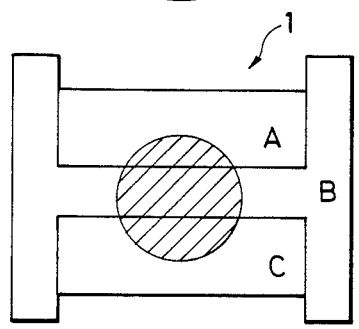
Figure 9:
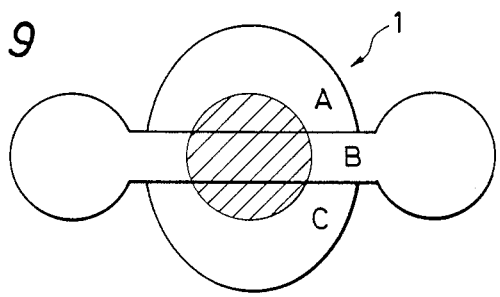

In the embodiment of FIG. 8, the portion B is extended and the extended portions are formed to be large in width, and in the embodiment of FIG. 9, the extended portions are formed to be substantially circular.

Each of those embodiments can operate in the same manner as in the foregoing case, since the portion B is formed so as to be substantially long.

As described above, according to the present invention, in a focus error detecting apparatus comprising a light detector for receiving light being passed through a given media and having astigmatism, and a signal generating circuit for generating a focus error signal on the basis of an output of the detector, the detector is divided into substantially three portions such that a first one of the portions is arranged between second and third ones of the portions, and the first portion is formed substantially longer than either of the second and third portions so that the state in which the amount of light received by the first portion is larger than that of each of the second and third portions is maintained when the shape of the light on the light detector becomes elongated in the direction of the division lines. Accordingly, it is possible to make zero-crossing occur at only one point so as to stabilize the pull-in operation of focus servo without, using any special electronic device such as a means for discriminating plural zero crossing points.

We claim:

1. A focus error detecting apparatus, comprising:
an astigmatism optical element for making an astigmatism aberration of a reflected light from a recording media;
a light detector for receiving said light passed through said astigmatism optical element; and
a signal generating circuit for generating a focus error signal on the basis of an output of said detector, said detector being divided into substantially three portions such that a first one of said portions is arranged between a second and a third one of said portions, and in which said first portion is formed substantially longer than either of said second and third portions to extend beyond the boundaries of said second and third portions, such that an amount of light received by said first portions is larger than that of each of said second and third portions when a shape of a spot of said light incident on said light detector becomes elongated in a direction substantially parallel to a length direction of said portions.

2. An apparatus as claimed in claim 1, wherein said first portion has a length L, and said second and third portions have equal lengths less than L.

3. An apparatus as claimed in claim 1, wherein said first portion has a length L, and said second and third portions have unequal lengths less than L.

4. An apparatus as claimed in claim 1, wherein said first portion is comprised of plural discontinuous segments, one of said segments being unitarily formed with said second and third portions.

5. An apparatus as claimed in claim 4, wherein said second and third portions are integrally joined to each other.

6. An apparatus as claimed in claim 1, wherein said first portion is elongated relative to said second and third portions in one direction only.

7. An apparatus as claimed in claim 1, wherein said second and third portions are formed as trapezoids having a shorter major length than a length of said first portion.

8. An apparatus as claimed in claim 1, wherein said second and third portions are formed as circular sections having diameters or chords of a shorter length than that of said first portion.

9. An apparatus as claimed in claim 1, wherein said first portion is formed so as to surround said second and third portions over more than 50% of their periphery.

10. An apparatus as claimed in claim 1, wherein said first portion is formed at its ends with enlarged portions located outboard of said second and third portions.

11. An apparatus as claimed in claim 1, wherein said signal generating circuit includes adder means coupled to outputs of said second and third portions, and differential amplifier means receiving as inputs (1) an output of said adder means, and (2) an output of said first portion.

12. An apparatus as claimed in claim 5, wherein said signal generating circuit includes differential amplifier means having inputs coupled to (1) an output of said integral second and third portions, and (2) an output of said first portion.

* * * * *